US011368284B2

(12) United States Patent
MacNeille et al.

(10) Patent No.: US 11,368,284 B2
(45) Date of Patent: Jun. 21, 2022

(54) VEHICLE BLOCKCHAIN TRANSACTIONS

(71) Applicant: Ford Global Technologies, LLC, Dearborn, MI (US)

(72) Inventors: Perry Robinson MacNeille, Lathrup Village, MI (US); John Michael Galan Ferrer, Carson, CA (US); Prashant Rao, Ypsilanti, MI (US); Taylor Hawley, Dearborn, MI (US); Joseph Wisniewski, Royal Oak, MI (US); Fling Finn Tseng, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 393 days.

(21) Appl. No.: 16/582,752

(22) Filed: Sep. 25, 2019

(65) Prior Publication Data
US 2021/0091927 A1   Mar. 25, 2021

(51) Int. Cl.
*H04L 9/06* (2006.01)
*H04L 41/0803* (2022.01)
*H04W 4/44* (2018.01)
*H04L 41/046* (2022.01)

(52) U.S. Cl.
CPC .......... *H04L 9/0637* (2013.01); *H04L 41/046* (2013.01); *H04L 41/0803* (2013.01); *H04W 4/44* (2018.02); *H04L 2209/38* (2013.01); *H04L 2209/84* (2013.01)

(58) Field of Classification Search
CPC . H04L 9/0637; H04L 41/046; H04L 41/0803; H04L 2209/38; H04L 2209/84; H04L 9/3297; H04L 9/3239; H04L 9/0643; H04W 4/44; H04W 4/40; H04W 80/08
See application file for complete search history.

(56) References Cited

U.S. PATENT DOCUMENTS

| | | | | |
|---|---|---|---|---|
| 2007/0096892 | A1* | 5/2007 | Nathan | G08G 1/161 340/471 |
| 2010/0304640 | A1* | 12/2010 | Sofman | A63H 18/12 446/456 |
| 2011/0205087 | A1* | 8/2011 | Kell | G08G 1/14 340/932.2 |
| 2012/0036187 | A1* | 2/2012 | Luboshitz | H04L 67/22 709/204 |
| 2016/0117636 | A1* | 4/2016 | Miller | G06Q 50/30 705/332 |

(Continued)

FOREIGN PATENT DOCUMENTS

DE    102010029931 A1    12/2011

*Primary Examiner* — Taghi T Arani
*Assistant Examiner* — Blake I Narramore
(74) *Attorney, Agent, or Firm* — Frank A. MacKenzie; Bejin Bieneman PLC

(57) ABSTRACT

A system is disclosed that may comprise: one or more processors of a center node, wherein the center node is a vehicle computer; and memory of the center node, wherein the memory stores instructions executable by the one or more processors, the instructions comprising to: determine a first network comprising the center node and a plurality of member nodes based on a mesh network of the center node and the plurality of member nodes; add at least one virtual node to the first network; and using the first network, exchange cryptographic data between the at least one virtual node, the center node, and the plurality of member nodes.

15 Claims, 7 Drawing Sheets

(56) References Cited

U.S. PATENT DOCUMENTS

| | | |
|---|---|---|
| 2016/0127895 A1* | 5/2016 | Bangole ................. H04L 63/10 380/279 |
| 2016/0174106 A1 | 6/2016 | Lee et al. |
| 2017/0070320 A1* | 3/2017 | Choi ....................... H04L 67/12 |
| 2017/0085632 A1* | 3/2017 | Cardote .................. H04L 67/02 |
| 2017/0086103 A1* | 3/2017 | Neves ................. H04W 84/005 |
| 2017/0134086 A1* | 5/2017 | Liu .................... H04B 7/18502 |
| 2018/0184269 A1* | 6/2018 | Christoval .............. H04W 4/38 |
| 2018/0259976 A1 | 9/2018 | Williams et al. |
| 2019/0149598 A1 | 5/2019 | Sawada et al. |
| 2019/0251077 A1* | 8/2019 | Yang ..................... H04L 9/3247 |
| 2019/0258268 A1 | 8/2019 | MacNeille et al. |
| 2019/0320004 A1* | 10/2019 | Allen .................. H04L 12/1836 |
| 2020/0213852 A1* | 7/2020 | Obaidi .................. H04L 63/123 |
| 2020/0295957 A1* | 9/2020 | Kim ..................... H04L 67/145 |
| 2020/0375011 A1* | 11/2020 | Tsibulevskiy ....... H02J 7/00036 |
| 2020/0396787 A1* | 12/2020 | Brugman .............. H04W 76/19 |
| 2020/0401952 A1* | 12/2020 | Gardner ................ G06Q 10/02 |
| 2020/0409375 A1* | 12/2020 | Bowe ..................... G08G 1/207 |
| 2021/0009365 A1* | 1/2021 | Ganesh ................... G05D 1/02 |
| 2021/0042361 A1* | 2/2021 | Leise ...................... G06Q 30/018 |
| 2021/0051085 A1* | 2/2021 | Park ....................... G06N 3/084 |
| 2021/0288714 A1* | 9/2021 | Liang .................. G05D 1/0027 |

\* cited by examiner

VEHICLE BLOCKCHAIN TRANSACTIONS

BACKGROUND

As more vehicles are furnished with equipment enabling extra-vehicular communication, there is a need for increased data security in a vehicle communication environment.

DETAILED DESCRIPTION

Figure 1:
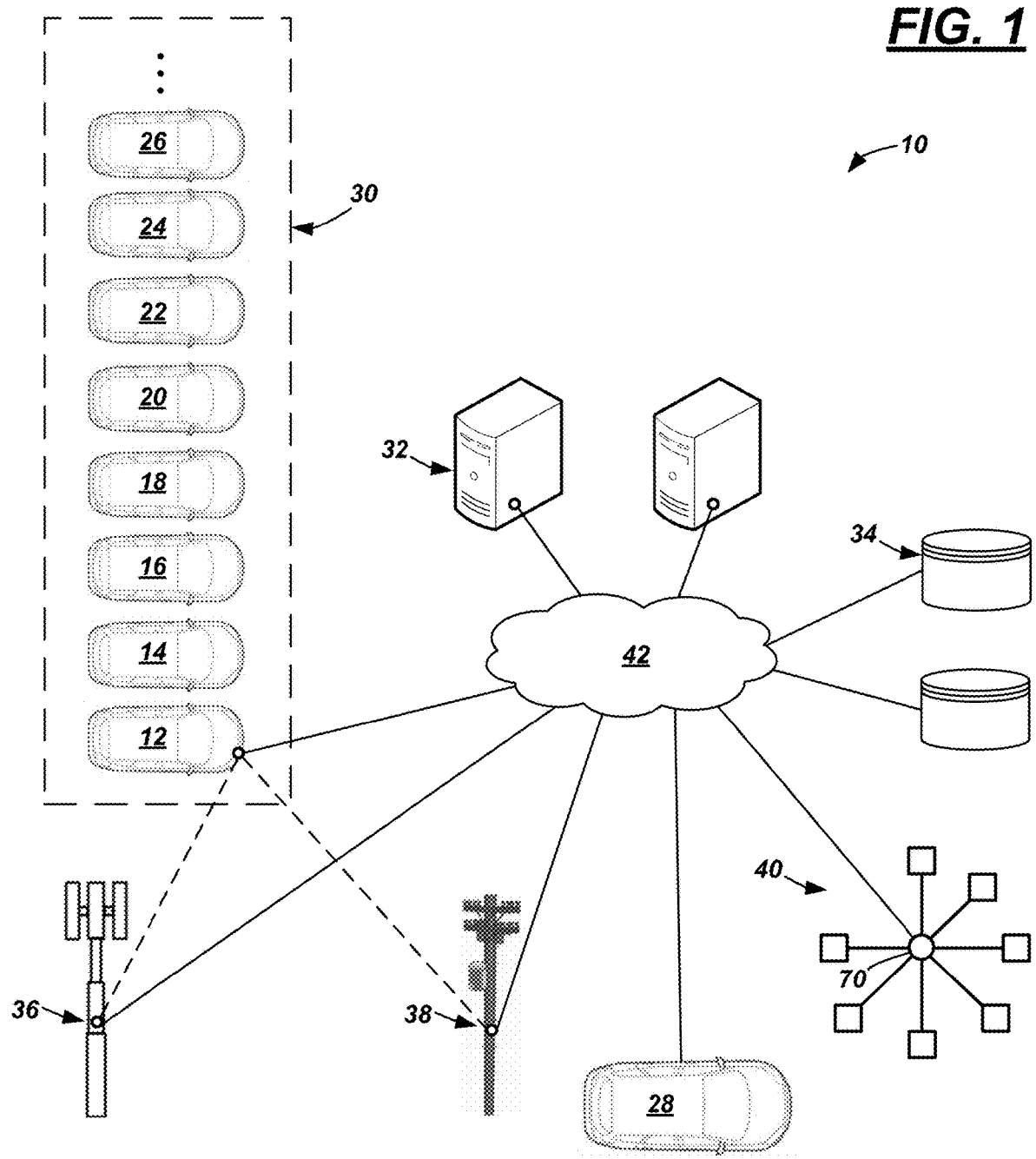
FIG. 1 is a schematic diagram of a blockchain system that comprises a plurality of vehicles.

A blockchain system is described in detail below that may comprise: one or more processors of a center node, wherein the center node is a vehicle computer; and memory of the center node, wherein the memory stores instructions executable by the one or more processors, the instructions comprising to: determine a first network comprising the center node and a plurality of member nodes based on a mesh network of the center node and the plurality of member nodes; add at least one virtual node to the first network; and using the first network, exchange cryptographic data between the at least one virtual node, the center node, and the plurality of member nodes.

According to the at least one example set forth above, the first network is a star network.

According to the at least one example set forth above, at least some of the plurality of member nodes are different vehicle computers, wherein at least one of the plurality of member nodes is an infrastructure node.

According to the at least one example set forth above, the cryptographic data includes transaction data and a cryptographic hash of a block of a blockchain.

According to the at least one example set forth above, the instructions further comprise, to: determine the mesh network by determining a wireless link topography of the center node and the plurality of member nodes.

According to the at least one example set forth above, the instructions to determine the first network comprises to: designate the center node as a hub; designate the plurality of member nodes as spokes of the first network; and identify one or more virtual links between the hub and spokes that include a mapping of the mesh network.

According to the at least one example set forth above, the instructions to determine the first network further comprises to: designate the at least one virtual node as a spoke of the first network; and identify a mapping of the hub and the virtual node using a long-range wireless communication protocol.

According to the at least one example set forth above, the instructions further comprise, to: after exchanging cryptographic data, use a gossip algorithm to disseminate a block of a blockchain to the plurality of member nodes.

According to the at least one example set forth above, using the gossip algorithm comprises: randomly selecting at least two of the plurality of member nodes for a pull message requesting blockchain data; and randomly providing at least two of the plurality of member nodes at least some of that blockchain data.

According to the at least one example set forth above, the at least one virtual node is one of a remote server, a second center node of a second network, or an isolated node.

According to the at least one example set forth above, the instruction to exchange cryptographic data further comprises to: determine that one of the plurality of member nodes is to conduct a blockchain transaction with the virtual node: or determine that the virtual node is to conduct a blockchain transaction with one of the plurality of member nodes.

According to the at least one example set forth above, the instructions further comprise to: store the cryptographic data at the center node and provide it to the plurality of member nodes for storage thereat.

According to the at least one example set forth above, the instructions further comprise to: receive (and/or store) compensation for storing the cryptographic data at the center node; disseminate compensation to the plurality of member nodes; or both.

According to the at least one example set forth above, the center node and the plurality of member nodes communicate with one another via a short-range wireless communication protocol, wherein the center node and the virtual node communicate with one another via a long-range wireless communication (LRWC) protocol.

According to the at least one example set forth above, the system further comprises: a gateway device enabling communication between the center node and the virtual node; and a short-range wireless communication system that comprises at least one wireless transceiver enabling communication between the center node and the plurality of member nodes.

According to at least one additional illustrative example, a method, comprises: determining, at a center node, a first network comprising the center node and a plurality of member nodes based on a mesh network of the center node and the plurality of member nodes; at the center node, adding at least one virtual node to the first network; and at the center node and using the first network, exchanging cryptographic data between the at least one virtual node, the center node, and the plurality of member nodes, wherein the center node is a vehicle computer.

According to the at least one example set forth above, the first network is a star network, wherein the cryptographic data includes transaction data and a cryptographic hash of a block of a blockchain.

According to the at least one example set forth above, the method further comprises: determining the mesh network by determining a wireless link topography of the center node and the plurality of member nodes.

According to the at least one example set forth above, the method further comprises: after exchanging cryptographic data, using a gossip algorithm to disseminate a block of a blockchain to the plurality of member nodes.

According to the at least one example set forth above, determining the first network further comprises: designating the center node as a hub; designating the plurality of member nodes as spokes of the first network; identifying one or more virtual links between the hub and spokes that include a mapping of the mesh network; designating the at least one virtual node as a spoke of the first network; and identifying a mapping of the hub and the virtual node using a long-range wireless communication protocol.

According to the at least one example set forth above, a computing device comprising a processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Turning now to the figures, wherein like reference numerals indicate like or similar features and/or functions, an example of a blockchain system 10 is shown. In FIG. 1, the system 10 may comprise a plurality of vehicles 12, 14, 16, 18, 20, 22, 24, 26, 28 wherein at least some of the vehicles form a mesh network 30 (e.g., vehicles 12-26), one or more remote servers 32 (e.g., two are shown for purposes of illustration only), one or more remote blockchain databases 34 (e.g., two are shown for purposes of illustration only), a first infrastructure node 36, a second infrastructure node 38, and a remotely-located network 40. As will be explained in greater detail below, using one or more elements of the system 10, vehicles 12-26 may participate in blockchain transactions wherein the transaction(s) potentially are stored at each of vehicles 12-26. More particularly, according to the illustrated example, vehicles 12-26 may form the mesh network 30, and one of the vehicles (e.g., vehicle 12) may determine and serve as a hub of a software-implemented star or other suitable network with respect to the remaining vehicles 14-26 so that blockchain transactions between any of the vehicles 12-26 and a virtual node (e.g., also referred to as a virtual vehicle) may be facilitated. The virtual node may comprise at least one remote server 32 or vehicle 28 (e.g., an isolated vehicle or one not part of mesh network 30). Furthermore, data security may be enhanced as at least vehicles 12-26 (within the mesh network 30) may store blocks of a blockchain transaction even though the transaction may not directly pertain to them. Consider for example an instance wherein vehicle 14 makes a purchase from remote server 32, and the purchase is recorded using blockchain at each of the vehicles 12-26—e.g., data security is enhanced even though vehicles 12, 16-26 are not directly parties to the transaction. Continuing with the example, vehicles 12, 16-26 which comply with storing the block (on behalf of vehicle 14) may be compensated (e.g., rewarded) for doing so. In this manner, data security is increased through redundancy and distributed storage. Blockchain processes will be explained in more detail following a description of the elements shown in FIG. 1.

Figure 2:
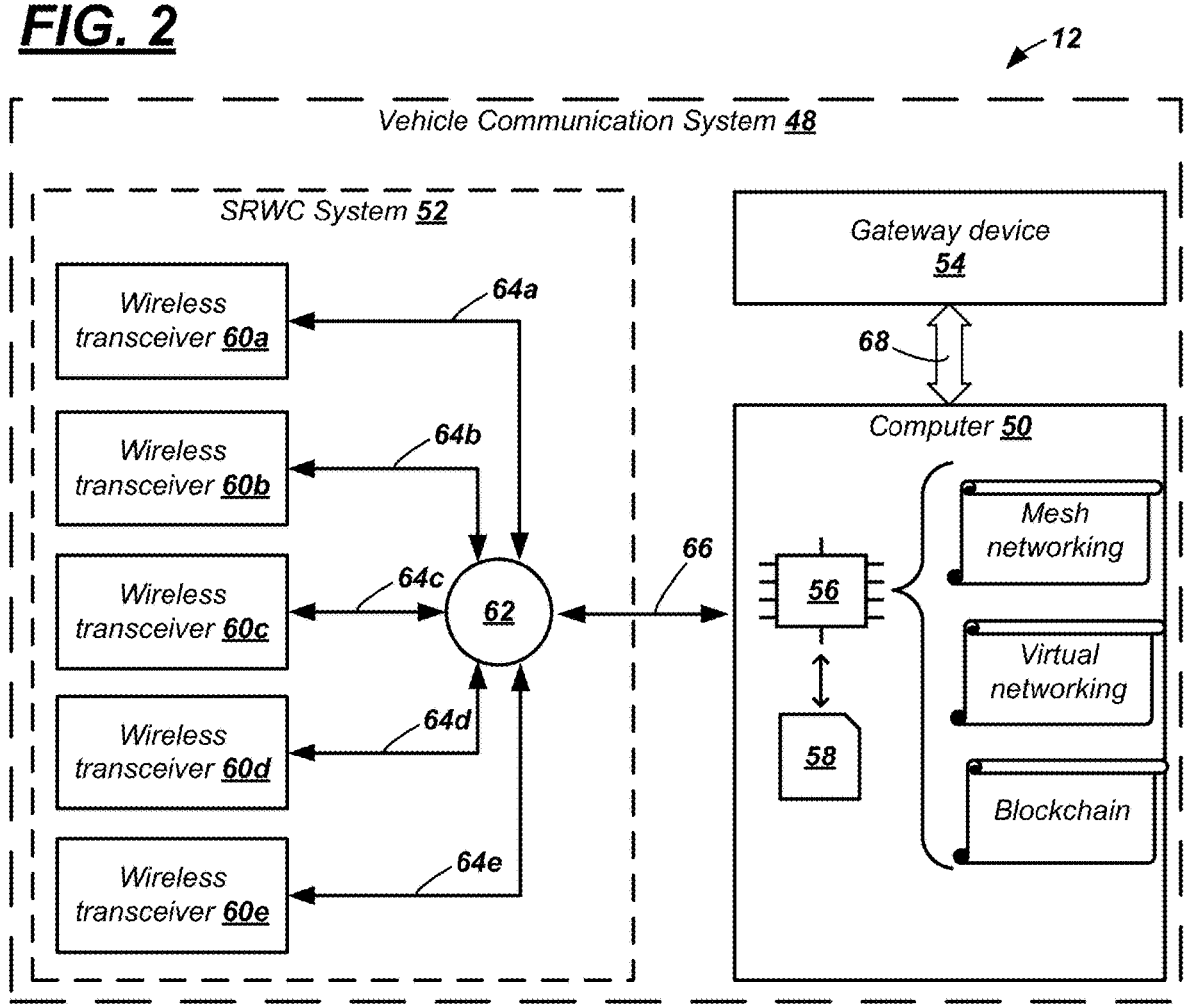
FIG. 2 is a schematic diagram of a vehicle communication system of at least one of the plurality of vehicles.
Figure 3:
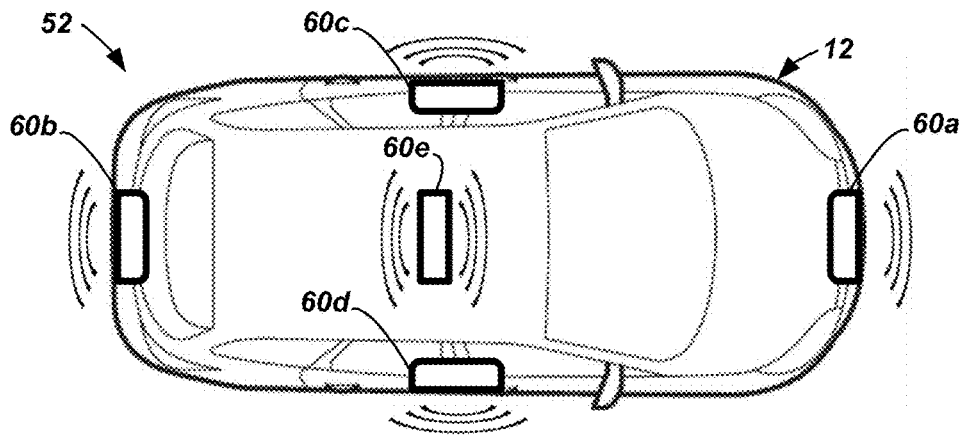
FIG. 3 is a schematic diagram illustrating a plurality of wireless transceiver locations on the vehicle of FIG. 2.

According to one example, each of the vehicles 12-28 may be similar or identical; therefore, only one will be described. Vehicle 12 may be a passenger vehicle, a truck, a sports utility vehicle (SUV), a recreational vehicle, a bus, or any other suitable vehicle that comprises a vehicle communication system 48, as shown in FIGS. 2-3. Vehicle communication system 48 may comprise a computer 50, a short-range wireless communication (SRWC) system 52, and a gateway device 54.

Computer 50 can be representative of a single computing device or multiple such computing devices. Whether it be one or many computing devices, computer 50 is programmed to execute instructions to carry out the blockchain transaction processes described herein. Thus, computer 50 may comprise one or more processors 56 (one is shown for purposes of illustration) and any suitable type and quantity of memory 58.

Processor(s) 56 may be programmed to process and/or execute digital instructions to carry out at least some of the tasks described herein. Non-limiting examples of processor(s) 56 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 56 read from memory 58 and execute one or more sets of instructions (e.g., computer programs) which may be embodied as a computer program product stored on a non-transitory computer-readable storage medium (e.g., such as memory 58). According to the illustration, some instructions executable by processor(s) 56 include mesh networking instructions, virtual networking instructions, and blockchain instructions. These and other non-limiting examples of instructions will be described below in the processes illustrated using flow diagrams, wherein these and other instructions may be executed in any suitable sequence unless otherwise stated. These instructions and the example processes described below are merely embodiments and are not intended to be limiting.

Memory 58 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 58 may store one or more sets of instructions which may be embodied as software, firmware, or other programming instructions executable by the processor(s) 56—including but not limited to the instruction examples set forth herein. In operation, processor(s) 56 may read data from and/or write data to memory 58.

As shown in FIGS. 2-3, short-range wireless communication (SRWC) system 52 may comprise one or more wireless transceivers 60a, 60b, 60c, 60d, 60e independently coupled to a switch 62 that is in communication with computer 50—e.g., 60a (at/near a front end of vehicle 12), 60b (at/near a rear end of vehicle 12), 60c (at/near a port side of vehicle 12), 60d (at/near a starboard side of vehicle 12), 60e (at/near a roof of vehicle 12). According to at least some examples, SRWC system 52 is capable of establishing so-called persistent point-to-point data-links between at least one of the wireless transceivers on one vehicle and at least one (corresponding) wireless transceiver on another vehicle. Further, each wireless transceiver may be configured so that it can establish multiple point-to-point data-links (e.g., with corresponding wireless transceivers on other vehicles). According to one example, each of the wireless transceivers 60a-60e may be similar or identical; therefore, only one will be described in detail.

Wireless transceiver 60a is an electronic hardware component that is configured to both send and receive wireless messages via a short-range wireless communication (SRWC) protocol (e.g., typically attenuating too severely at distances over 150 meters). E.g., the wireless transceiver 60a may comprise, among other things, a wireless chipset, receiver circuit, transmission circuit, an antenna, and the like. Non-limiting examples of SRWC protocols include a Dedicated Short-Range Communication (DSRC) protocol, a Wi-Fi protocol, a Wi-Fi Direct protocol, a Bluetooth or Bluetooth Low Energy (BLE) protocol, etc. The wireless transceivers 60a-60e may be used to facilitate vehicle-to-vehicle (V2V) communication and vehicle-to-infrastructure (V2I) communication.

According to one example, switch 62 is a high-speed switch that is coupled to each of wireless transceivers 60a-60e via respective links 64a, 64b, 64c, 64d, 64e and that is coupled to processor(s) 56 via a link 66. For example, switch 62 may be implemented as an FPGA or as a so-called crossbar switch (e.g., network on a chip). In another example, switch 62 could be implemented in software by computer 50.

Gateway device 54 may be any suitable electronics hardware configured to send and receive long-range wireless data between the vehicle 12 and remote servers 32, remote blockchain databases 34, remotely-located network 40, and/or isolated vehicle 28. E.g., the gateway device 54 may comprise, among other things, a satellite or cellular chipset, a wireless receiver circuit, a wireless transmission circuit, an antenna, and the like. Non-limiting examples of long-range wireless communication (LRWC) protocols include cellular and satellite communication protocols (e.g., 3G, 4G, 5G, etc. protocols).

Gateway device 54 and computer 50 may communicate via any suitable wired and/or wireless network 68 (FIG. 2). In at least one example, the wired and/or wireless network 68 includes one or more of a controller area network (CAN) bus, Ethernet, Local Interconnect Network (LIN), or the like. In some examples, network 68 may comprise discrete connections instead (or in addition to a bus). Still further, wireless and other wired examples of network 68 also exist.

As discussed above, each of vehicles 12-26 may comprise the computer 50, the SRWC system 52, and the gateway device 54; however, in some examples, at least some of vehicles 14-26 may not have a computer that is configured with the same instructions as those of vehicle 12 and/or may not have a respective gateway device. For instance, in this latter example, some of the vehicles 14-26 may be configured to communicate via short-range wireless communication (SRWC) (e.g., using a computer and SRWC system similar to that shown in FIG. 2); however, such a vehicle may not be configured to communicate via long-range wireless communication (LRWC). Thus, in the present context, such vehicles 12-26 may each communicate over short distances (via SRWC), and vehicles 14-26 may rely upon vehicle 12 to act as a gateway to communicate over long distances and conduct blockchain transactions with remote server(s) 32 and/or isolated vehicle 28.

Returning to FIG. 1, isolated vehicle 28 represents a vehicle which may be generally similar to vehicle 12; however, vehicle 28 is not part of mesh network 30. Thus, e.g., vehicle 28 may communicate via one or more LRWC protocols (e.g., such as cellular or satellite communication). Thus, it may comprise a gateway device; however, it may or may not be configured to utilize SRWC.

Remote server(s) 32 may comprise one or more computing devices—each computing device comprising processor(s) and memory similar to the hardware described above. Typically, a company or other entity is associated with and/or operates each server; accordingly, each server stores computer programs and data associated with the particular entity. For example, remote server 32 could be associated with a restaurant—and for illustrative purposes only, such a remote server may store and execute a computer program that hosts a website, a computer program that supports a mobile application located on a user's mobile device, a computer program that stores and parses user files, a computer program that stores and parses personally identifying information (PII) and/or financial data, and at least one recordkeeping program that supports blockchain. Non-limiting examples of entities associated with remote server(s) 32 include a vehicle manufacturer or service entity, a retail service (e.g., such as a restaurant, a hotel, a clothing manufacturer, etc.), and service entities which may have an online presence.

Remote database(s) 34 can be any suitable computer database, data repository or other data stores include various mechanism(s) for storing, accessing, and retrieving various kinds of data, including a hierarchical database, a set of files in a file system, an application database in a proprietary format, a database management system (DBMS), etc. According to at least one example, remote database(s) 34 store cryptographic data. And in at least one example, the cryptographic data includes transaction data and a cryptographic hash of a block of a blockchain (e.g., a cryptographic hash that includes a previous block of a blockchain—thereby linking a current block (regarding the current transaction data) to a predecessor block); typically, the hash comprises the previous blockchain block and a so-called salt (e.g., non-limiting examples of salts include a timestamp or other unique identifier). As used herein, transaction data means the information that pertains to a blockchain transaction—e.g., typically, a desire to memorialize this information is the reason for generating a new record (a block) in the blockchain.

First infrastructure node 36 may be any suitable non-vehicle node. In the instant example, first infrastructure node 36 is illustrated as a cellular base transceiver station or eNodeB coupled to a tower; however, this is merely an example. In other examples, the first infrastructure node 36 may be a different LRWC-compatible device and/or coupled to a different structure.

Second infrastructure node 38 also may be any suitable non-vehicle node. In the instant example, second infrastructure node 38 is illustrated as a Wi-Fi wireless transceiver (e.g., similar to any of 60a-60e) and corresponding Wi-Fi computing device coupled to a telephone pole; however, this is merely an example. In other examples, the second infrastructure node 38 may be a different SRWC transceiver (e.g., Bluetooth, BLE, DSRC, etc.) and/or coupled to a different structure.

Remotely-located network 40 is representative of another network of vehicles which do not belong to the mesh network 30—e.g., they are distantly located from mesh network 30. According to one example, network 40 may be a star network and may comprise a center node 70 which communicates with vehicle 12, as described more below. Further, as described more below, mesh network 30 may be organized as a star network similar to remotely-located network 40; this further will be explained more below.

Land and/or wireless communication system 42 is shown communicatively coupling vehicle 12, remote server(s) 32, remote blockchain database(s) 34, first infrastructure node 36 (which may form part of the system 42), second infrastructure node 38 (which also may form part of the system 42), vehicle 28, and remotely-located network 40. System 42 may comprise land network hardware elements that enable connectivity to public switched telephone network (PSTN) such as that used to provide hardwired telephony, packet-switched data communications, internet infrastructure, and the like. And system 42 further may comprise wireless network hardware elements that include satellite communication architecture and/or cellular telephone architecture that enable communication over wide geographic regions. Thus, in at least one example, system 42 could include any suitable cellular infrastructure that could include eNodeBs, serving gateways, base station transceivers, and the like. Further, system 42 could utilize any suitable existing or future cellular technology (e.g., including LTE, CDMA, GSM, etc.).

Figure 4:
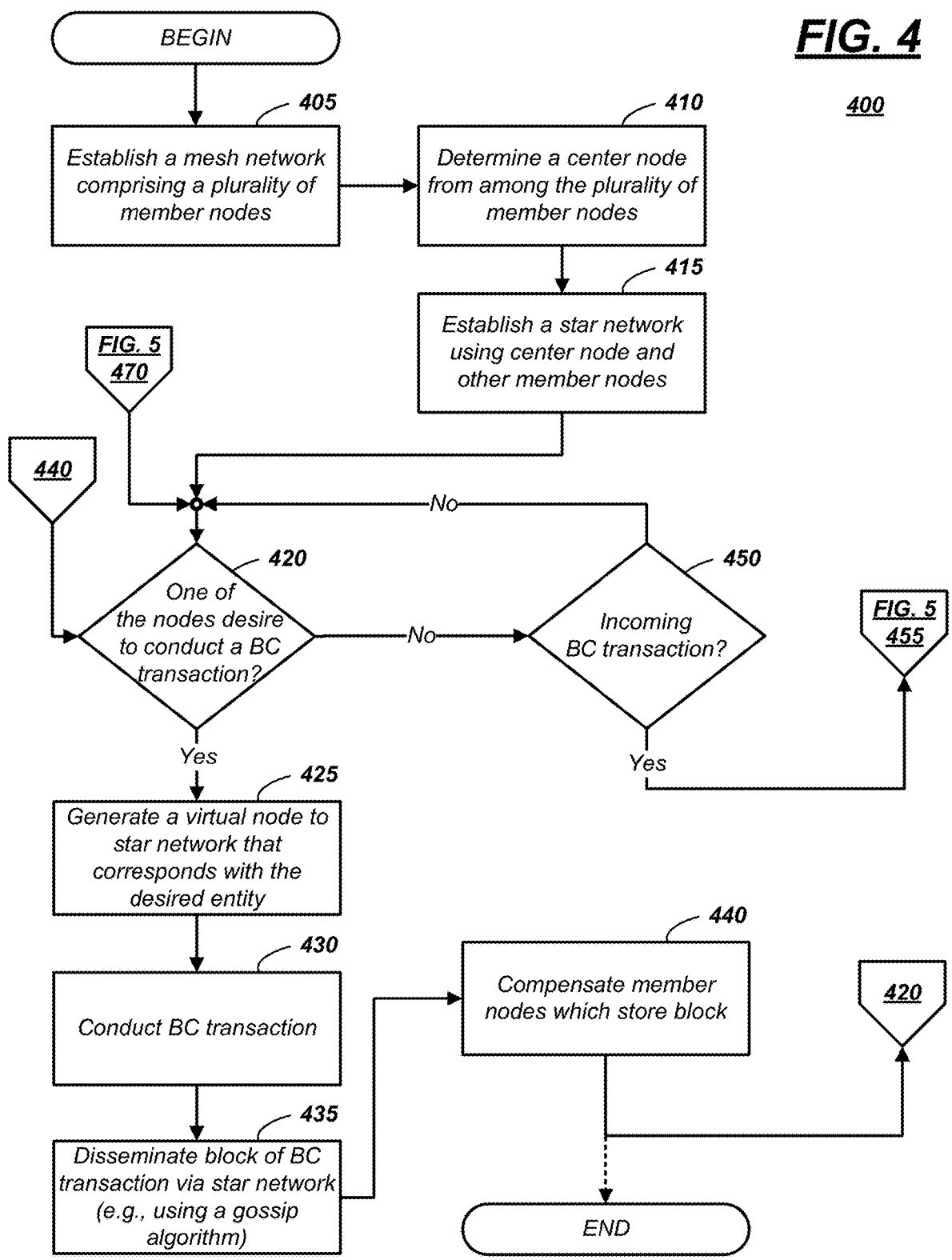
FIGS. 4-6 are flow diagram(s) illustrating a process of conducting a blockchain transaction using blockchain system.
Figure 5:
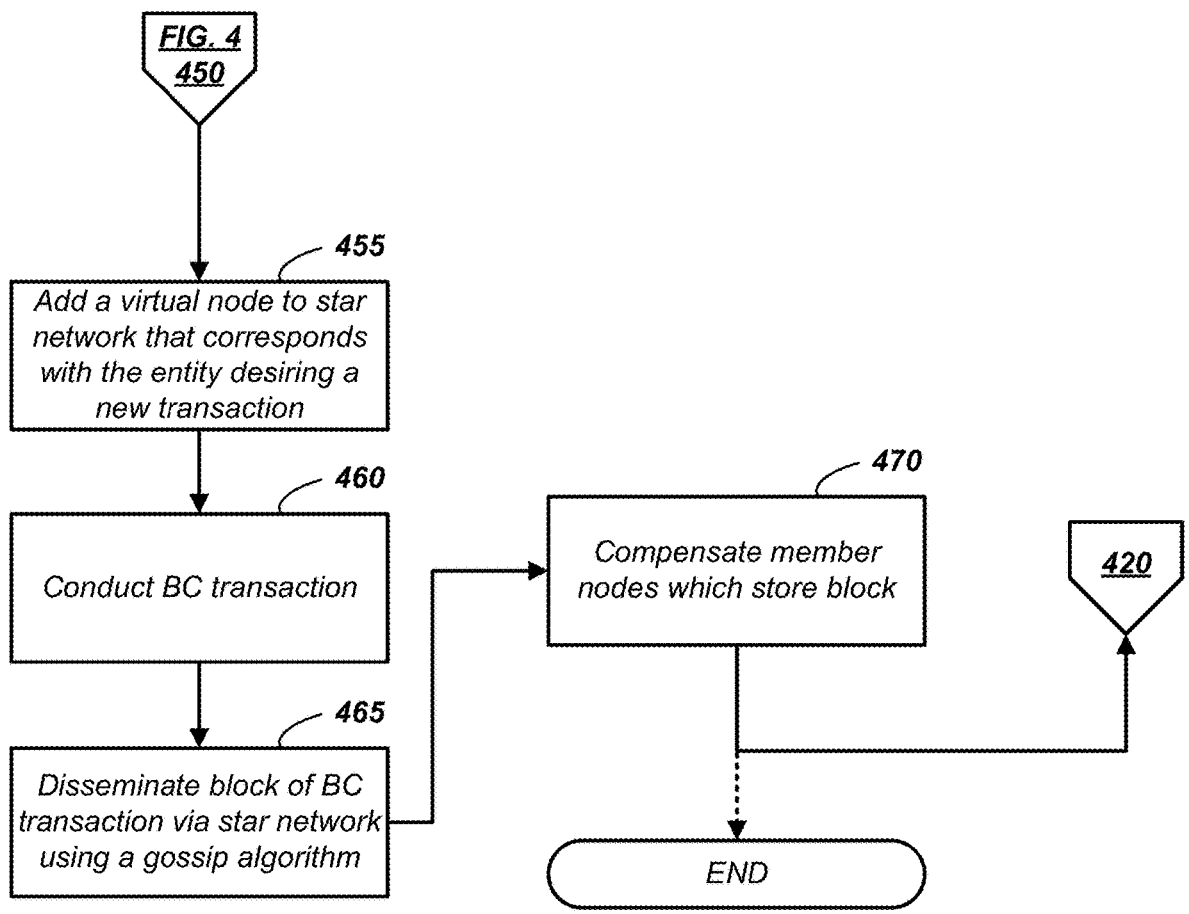
Figure 6:
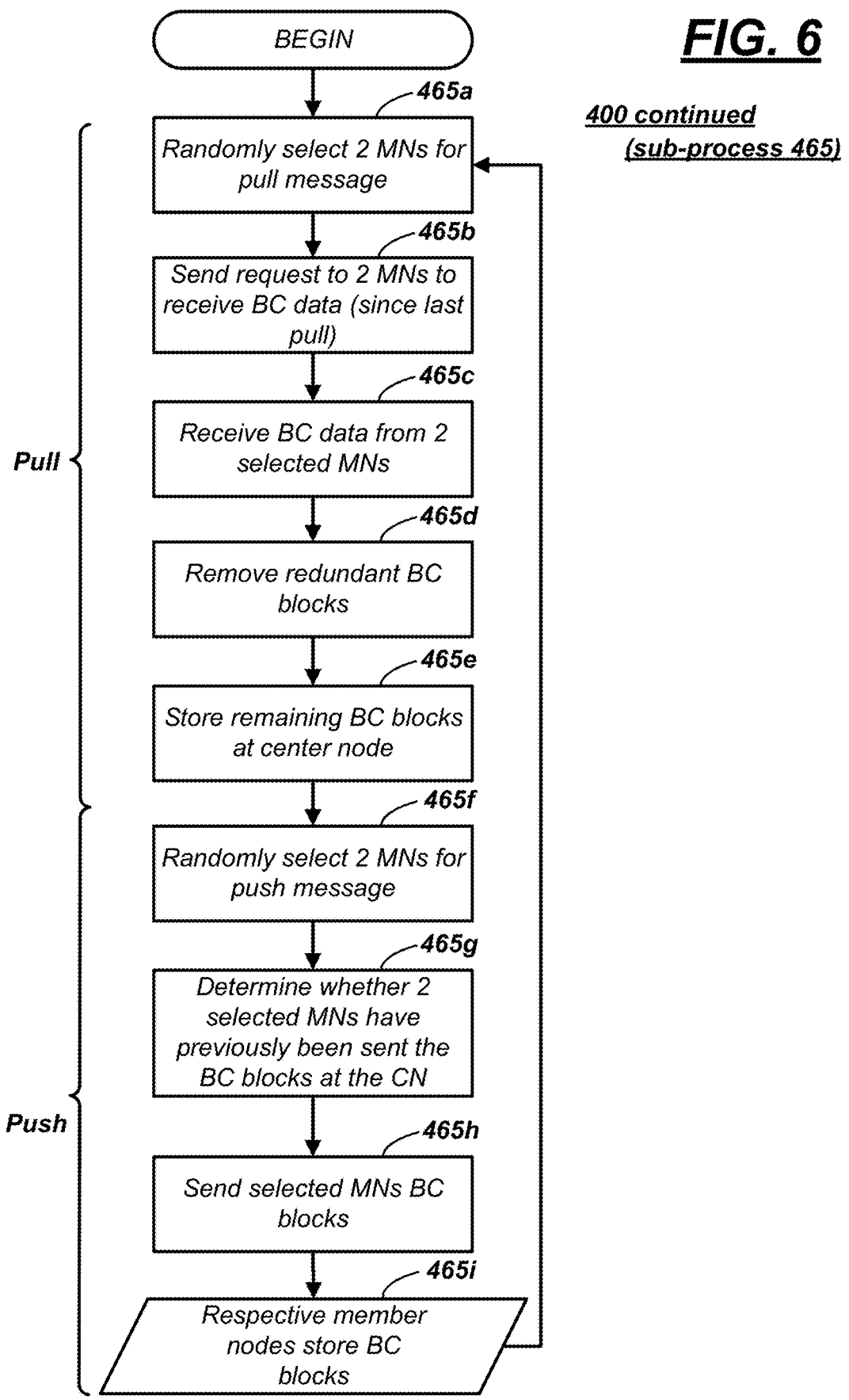

FIGS. 4-6 are flow diagram(s) illustrating a process 400 of conducting a blockchain transaction using blockchain system 10. The process 400 comprises software instructions executable by computer 50 (e.g., the one or more processors 56), wherein the instructions and corresponding blockchain (BC) blocks may be stored in memory 58 thereof. At least some software instructions are illustrated as instructional blocks in the diagrams (it will be appreciated that instructional blocks (e.g., software) are distinguishable from BC blocks (e.g., blockchain transactions)). It will be appreciated that while not necessarily explained explicitly in process 400, other software instructions may be carried out by other devices—e.g., by vehicles 14-28, by remote server(s) 32, by first and/or second infrastructure nodes 36, 38, and/or by at least one vehicle in remotely-located network 40.

Process 400 may begin with instructional block 405. In instructional block 405, mesh network 30 may be established between a plurality of member nodes. As used herein, a mesh network means a local network topology in which member nodes connect to one another directly and dynamically in a non-hierarchical fashion; typically, each member node attempts to wirelessly connect to as many other member nodes as possible—e.g., being constrained by various physical limitations. E.g., a typical physical limitation of the mesh network is range which may make wireless connection difficult due to wireless signal attenuation, physical obstructions, weather conditions, etc.

Figure 7:
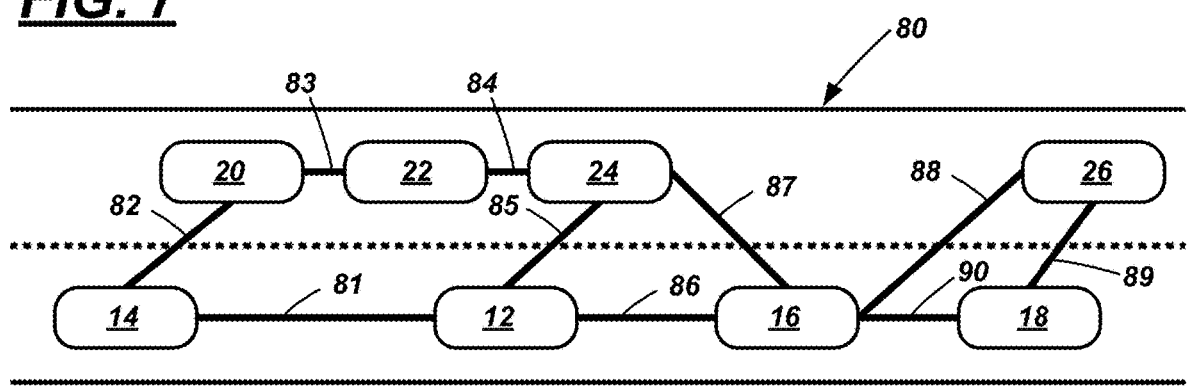
FIG. 7 is a schematic diagram illustrating the plurality of vehicles as member nodes in a mesh network.

As used herein, a member node means a computer that is wirelessly connected to another computer via a short-range wireless communication (SRWC) protocol within a mesh network. Thus, in the context of the present example, the member nodes can be the computers of the various vehicles 12-26 (e.g., such as computer 50 of vehicle 12). However, in at least some examples, a member node may be an infrastructure computer or other like computers (e.g., such as first or second infrastructure nodes 36, 38). To illustrate block 405, the mesh network 30 comprises the computers of vehicles 12-26, wherein in FIG. 7, the vehicles 12-26 are shown moving along a roadway 80. The arrangement and/or spacing of the vehicles 12-26 on the roadway 80 is merely an example (and not to scale). And other arrangements and/or spacings are contemplated.

Figure 8:
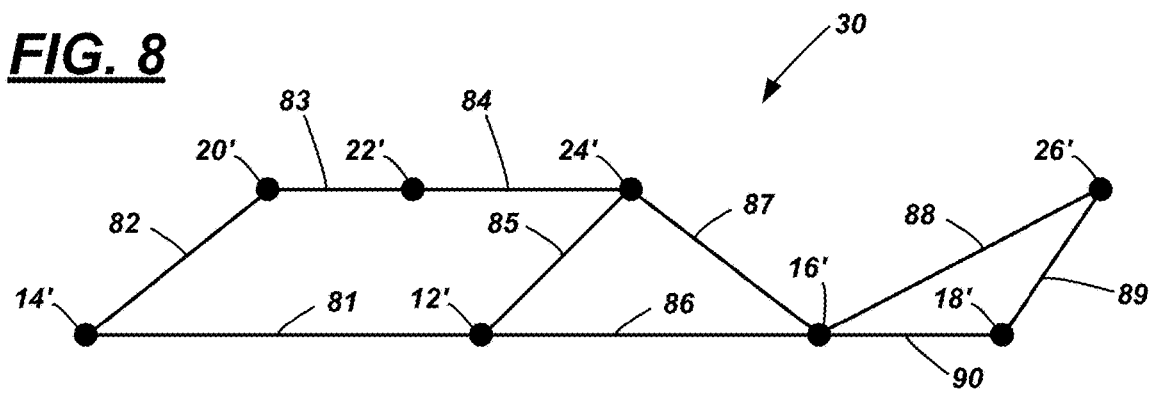
FIG. 8 is a graphical depiction of the member nodes of the mesh network of FIG. 7.

The member nodes may establish any suitable short-range wireless communication; by way of example only, the mesh network 30 may be facilitated using DSRC. Thus, in instructional block 405, each member node may establish a direct wireless link with at least one other member node. In accordance with FIG. 7, a wireless link topology may be established as set forth in Table I below; FIG. 8, shows a wireless link topology example wherein the member nodes (designated as 12', 14', 16', 18', 20', 22', 24', 26') are mapped to one another thereby defining mesh network 30. As used herein, a wireless link topography means an arrangement of wireless links between a plurality of member nodes, wherein the one or more wireless links of each member node are determined based on wireless connections between the member nodes. Thus, to illustrate a few examples, member node 12' may communicate with member node 14' via wireless link path 81, member node 12' may communicate with member node 24' via wireless link path 85, and member node 12' may communicate with member node 16' via wireless link path 86.

TABLE I

| Vehicle | Member Node | Link Path to other Member Nodes | Respective Wireless Link Path |
| --- | --- | --- | --- |
| 12 | 12' | 14', 24' 16' | 81, 85, 86 |
| 14 | 14' | 12', 20' | 81, 82 |
| 16 | 16' | 12', 24', 26', 18' | 86, 87, 88, 90 |
| 18 | 18' | 16', 26' | 90, 89 |
| 20 | 20' | 14', 22' | 82, 83 |
| 22 | 22' | 20', 24' | 83, 84 |
| 24 | 24' | 22', 12', 16' | 84, 85, 87 |
| 26 | 26' | 16', 18' | 88, 89 |

In instructional block 410 which follows, one or more of the member nodes may determine a center node from among the plurality of member nodes. As used herein, a center node is also a member node; and the term 'center is merely used to differentiate one particular member node from the other member nodes. In part, the center node may be determined using an algorithm which determines which of the member nodes is best situated to serve as a hub (e.g., of a star network) to communicate with the other member nodes, provided that the center node candidates each comprise a gateway device facilitating long-range communication and a corresponding computer (of the member node) is programmed to execute suitable mesh networking instructions, suitable virtual networking instructions, and suitable blockchain instructions.

As described more below, it should be appreciated that, in process 400, a star network is described as a virtual network overlaying the mesh network 30; however, this is merely one example. Other network topologies may be used instead; e.g., in other examples, a ring network, a bus network, a tree network, or another mesh network may be virtually overlaid atop the mesh network 30.

According to the illustrated example, computer 50 (vehicle 12), among others, may determine that it (member node 12') should be the center node. Again, this may be determined by consensus with the other member nodes or may be determined independently.

Figure 9:
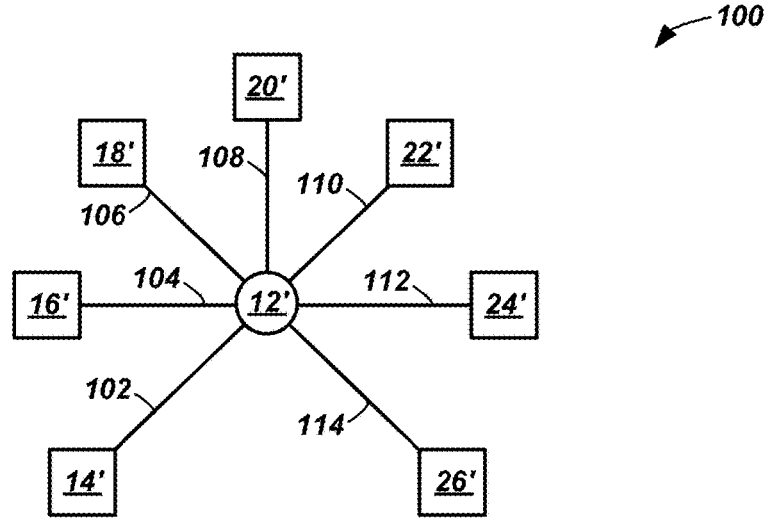
FIG. 9 is a graphical depiction of a star network comprising the member nodes of FIG. 8, wherein the star network is based on the mesh network.

Thus, in instructional block 415, computer 50 establishes a star network comprising itself and the remaining member nodes (e.g., 14'-26'). The star network is a virtual network (i.e., executed in software) essentially overlaying a physical network (the mesh network 30). Accordingly, the virtual links described below also are facilitated in software. A star network is defined by the center node (member node 12') being represented as a hub and the remaining member nodes (e.g., 14'-16') being represented as spokes directly connected to the hub (i.e., no intervening member nodes). FIG. 9 illustrates an example of a star network 100 that is based on the mesh network 30, wherein the member nodes (14'-16') are connected to center node 12' via virtual links 102, 104, 106, 108, 110, 112, 114, respectively.

Per instructional block 415, computer 50 may determine a mapping (in software) to communicate with other vehicles 14-26 according to the star network 100. An example of the mapping is shown below in Table II, which lists the example center node (member node 12') and for each of the other member nodes: a virtual link, the corresponding member node, an example of the mapping of the center node (CN) to the respective member node (MN), and an example of the mapping of the respective member node (MN) back to the center node (CN).

TABLE II

| Center Node (CN) | Virtual Link | Member Node (MN) | Example of Mapping of CN to Respective MN | Example of Mapping of MN back to CN |
|---|---|---|---|---|
| 12' | 102 | 14' | 81 | 81 |
|  | 104 | 16' | 86 | 86 |
|  | 106 | 18' | 86 to 90 | 90 to 86 |
|  | 108 | 20' | 81 to 82 | 82 to 81 |
|  | 110 | 22' | 85 to 84 | 84 to 85 |
|  | 112 | 24' | 85 | 85 |
|  | 114 | 26' | 86 to 88 | 88 to 86 |

As stated above, the mesh network 30 (and consequently the virtual network 100) may be comprised of vehicles, infrastructure, and the like. Further, instructional blocks 405, 410, 415 may be repeatedly updated as one or more of the vehicles 12-26 (and/or infrastructure nodes) move and in and out of the particular mesh network. For example, the mesh network 30 repeatedly may be formed ad hoc and is not required to be a convoy of vehicles traveling to a common destination. The ad hoc nature of the mesh network 30 may result in further widespread dissemination of the blocks of the blockchain—thereby further improving data security.

Once the virtual network 100 is established, in instructional block 420, computer 50 may determine whether one of the member nodes 12'-26' desires to conduct a blockchain transaction. If one of the member nodes 12'-26' desires to conduct such a transaction, the process 400 may proceed to instructional block 425; otherwise, the process may proceed to instructional block 450.

According to an example of instructional block 420, one of the vehicles 14-26 may desire to make a transaction with remote server 32 via mesh network 30 and via the internet. For sake of example only, member node 20' (vehicle 20) is illustrated as making the request of center node 12' (vehicle 12); the request may comprise initiating a potential transaction between member node 20' and the remote server 32. Continuing with this present example, the member node 20' communicates with center node 12' via virtual link 108 (e.g., via wireless links 82 to 81 of mesh network 30).

In response, in instructional block 425, computer 50 may configure in software a virtual node 120 (FIG. 10) representative of the remote server 32 (see star network 100'). A virtual link 122 between the center node 12' and virtual node 120 may be representative of a physical mapping that includes one or more paths from gateway device 54, through the land and/or wireless communication system 42, and ultimately to the remote server 32. Thus, instructional block 425 comprises configuring a new spoke (e.g., according to the previously-described hub and spoke arrangement).

Once the star network 100' is established, in instructional block 430 which follows instructional block 425, the blockchain transaction may occur between the remote server 32 and the vehicle 20. This blockchain transaction could be any suitable transaction including but not limited to purchases, transfers of property, signatures to agreements, and the like.

Instructional block 430 may comprise generating and/or transmitting (e.g., passing through) cryptographic data to memorialize the blockchain transaction, wherein the cryptographic data includes transaction data and a cryptographic hash of a block of a blockchain (typically, a previous blockchain block). The newly-created block may be stored at the remote server 32, and according to an illustrative example herein, it also may be stored at vehicles 12-26 (as described below).

In instructional block 435 which follows (and continuing with the present example), the cryptographic data is received at the center node 12' and center node 12' disseminates it within the star network 100'. In one example, the center node 12'—which operated as a gateway between member node 20' (vehicle 20) and virtual node 120 (remote server 32)—receives the cryptographic data as part of its gateway function. According to another example, the center node 12' operates as simply a pass-through device, but member node 20' provides a notification to center node 12' that includes a new-created blockchain block. Regardless of how center node 12' determines the new cryptographic data and disseminates it. FIG. 6 illustrates one non-limiting process 465 by which this dissemination may occur (e.g., a gossip algorithm) and will be described in detail more below.

Instructional block 440 may follow instructional block 435. In instructional block 440, each member node 12'-26' which stores the new block (of the blockchain transaction between vehicle 20 and the remote server 32) may receive compensation (e.g., a reward) (thus, even center node 12' may store the new block too). According to an example, the center node 12' further reports the blockchain transaction to remote database 34—this may include providing the new block for storage in database 34, as well an indication of which member nodes 12'-26' were compliant in storing the respective new blockchain block. A respective entity (e.g., such as a company operating server 32) may perform the compensation in any suitable manner. If compensation is communicated from the remote server 32 to the center node 12', then center node 12' may disseminate the compensation using the star network 100 (e.g., and/or according to the gossip algorithm described below).

Following instructional block 440, the process 400 may end. Alternatively, it may loop back and repeat instructional block 420 et seq. It should be appreciated in instructional blocks 420-440 the virtual node was described as remote server 32; however, this is merely one example. The virtual node could also be an isolated node (e.g., corresponding to isolated vehicle 28) and/or the center node 70 of remotely-located network 40. Thus, vehicles such as vehicle 28 may be connected and participate in blockchain transactions. Similarly, when the virtual node 120 represents center node 70 (of a remotely-located mesh network (a physical network) and corresponding overlaid network 40 (in software)), then additional dissemination of new blockchain blocks may occur further improving data security by redundancy. Other aspects of instructional blocks 420-440 may otherwise be similarly or identically carried out.

Turning now to instructional block 450, recall that instructional block 450 follows instructional block 420 when the center node 12' determines that no member nodes 12'-26' presently desire to initiate a blockchain transaction. In instructional block 450, the center node 12' may determine whether an incoming transaction is occurring (e.g., whether a third party is initiating a blockchain transaction via the mesh network 30—with one of the member nodes 12'-16'). When an incoming transaction request is occurring, then process 400 proceeds to instructional block 455 (FIG. 5). And when no incoming transaction request is occurring, then process 400 may loop back to instructional block 420 and repeat.

In instructional block 455, when computer 50 (center node 12') determines that an entity associated with the incoming transaction request desires a new blockchain transaction with one of the member nodes 12'-26', then computer 50 may add a new virtual node (e.g., similar to virtual node 120) to the star network 100' and generates a new virtual link (e.g., similar to virtual link 122). This instructional block may be similar to instructional block 425; therefore, it will not be re-explained in great detail.

Instructional blocks 460, 465, and 470 may follow instructional block 455. In at least one example, instructional blocks 460, 465, and 470 may be similar or identical to instructional blocks 430, 435, 440, respectively, which were described in detail above; therefore, these will not be re-explained again here. Also, similar to the instructional blocks described above, following instructional block 470, the process 400 may end or may loop back to instructional block 420 and repeat block 420 et seq.

Figure 10:
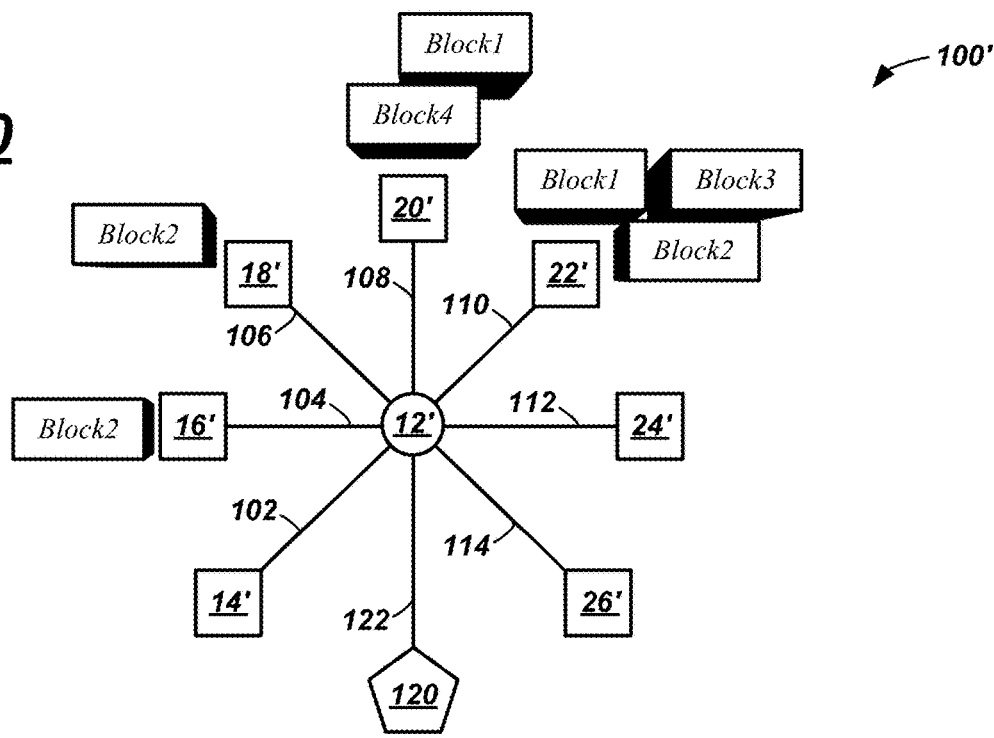
FIG. 10 comprises the star network of FIG. 9 and that further comprises a virtual node.

Turning to FIG. 6, one example of a sub-process 465 is described for disseminating a new block of a blockchain (wherein the new block may be created during process 400—e.g., as part of block 430 or 460). More particularly, sub-process 465 is an example of a gossip algorithm, wherein instructional blocks 465a-465e are related to a pull transaction and instructional blocks 465f-465i are related to a push transaction. FIG. 10 also illustrates blockchain blocks which may be stored at the computer of various member nodes. Among other things, FIG. 10 illustrates a new blockchain block Block4 as part of the blockchain transaction in process 400—e.g., between member node 20' (vehicle 20) and virtual node 120 (remote server 32). It should be appreciated that this is merely one example, and that other disseminations processes exist as well.

Process 465 may begin with instructional block 465a which includes the computer 50 of center node 12' randomly selecting (from among the star network 100) two member nodes (MNs) for a pull message. For illustrative purposes only, consider that member nodes 20' and 22' are randomly selected.

In instructional block 465b which may follow, the computer 50 of center node 12' sends a request to the two randomly-selected member nodes of instructional block 465a (e.g., to 20', 22') requesting to receive blockchain (BC) data since the last time the computer 50 sent a pull message. FIG. 10 illustrates that member node 20' is storing blockchain blocks Block1, Block4 and member node 22' is storing blockchain blocks Block1, Block2, Block3. Again, these blockchain blocks are merely examples to illustrate operation.

In instructional block 465c which may follow, the computer 50 of center node 12' receives the blockchain blocks from the two randomly-selected member nodes of instructional block 465a. Continuing with the example, computer 50 receives from member nodes 20', 22': blockchain blocks Block1, Block4, Block1, Block2, Block3.

In instructional block 465d which may follow, the computer 50 of center node 12' may remove (e.g., delete or ignore) any redundant blockchain blocks. According to the continuing example, computer 50 of center node 12' may consider for evaluation only blockchain blocks Block1, Block2, Block3, Block4 (as one of the example blockchain blocks was redundant).

In instructional block 465e which may follow, the computer 50 of center node 12' may store only the blockchain blocks considered for evaluation in instructional block 465d. According to the continuing example, computer 50 of center node 12' may store in memory 58 blockchain blocks Block1, Block2, Block3, Block4.

In instructional block 465f which may follow, the computer 50 of center node 12' may randomly select to member nodes for a push message in order to push blockchain data. Consider for example that center nodes 12' randomly selects member nodes 16' and 18' for the push message.

In instructional block 465g which may follow, the computer 50 of center node 12' may determine whether the randomly-selected member nodes (of instructional block 465f) have previously been sent the blockchain blocks now stored at the center node (CN) 12'. For example, computer 50 determines whether member nodes 16', 18' previously been sent blockchain blocks Block1, Block2, Block3, Block4. Per the example shown in FIG. 10, computer 50 may determine that center node 12' previously sent each of member nodes 16', 18' blockchain block Block2.

In instructional block 465h which may follow, the computer 50 of center node 12' sends those blockchain blocks not previously-sent to the randomly-selected member nodes of instructional block 465f. Continuing with the example, computer 50 does not send Block2 (as it was previously sent); however, computer 50 does send to each of member nodes 16', 18' blockchain blocks Block1, Block3, Block4.

In instructional block 465i which may follow, each of the computers of the member nodes 16', 18' may store the blockchain blocks provided in instructional block 465h. According to the continuing example, the computers of the member nodes 16', 18' store in respective memory the blockchain blocks Block1, Block3, Block4 with the previously (respectively) stored Block2.

Following instructional block 465i, sub-process 465 may loop back to instructional block 465a et seq. and repeat. Accordingly, process 400 (and sub-process 465) may loop back and repeat as many times as desirable.

Other examples also exist. For example, in the figures, only one virtual node is shown. However, it should be appreciated that, at any given time, the star network 100' may comprise multiple virtual nodes concurrently. Further, in at least some instances, when the blockchain transaction is completed with at least one of the vehicles 12-26, then the computer 50 (center node 12') may delete or otherwise remove the respective virtual node from the star network 100'.

Still other examples exist. For example, according to another implementation of process 400, an algorithm different than a gossip algorithm can be used (see blocks 435, 465). For example, in block 435 and/or block 465, any suitable epidemic algorithm could be used to disseminate or multicast the suitable information.

Thus, there has been described a blockchain system that includes a plurality of vehicles which can operate in a mesh network (e.g., a physical layer). One of the vehicles may operate as a center node that distributes data via a virtual network (e.g., a software layer) related to the physical layer. In this manner, when one of the vehicles of the mesh network participates in a blockchain transaction with a computing device (outside of the mesh network) and a new block is created, the new blockchain block may be stored among potentially all of the plurality of vehicles. Dissemination may be executed efficiently using a gossip algorithm or the like. Ultimately, blockchain security may be enhanced due to redundancy across multiple vehicles and distributed storage.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
   one or more processors of a center node, wherein the center node is a vehicle computer; and
   memory of the center node, wherein the memory stores instructions executable by the one or more processors, the instructions comprising instructions to:
      join a peer-to-peer mesh network having a plurality of member nodes using short-range wireless communication (SRWC);
      determine a first network comprising the center node and the plurality of member nodes of the mesh network by remapping the mesh network as a star network based on the center node as a hub and the plurality of member nodes as spokes, wherein at least some of the plurality of member nodes are different vehicle computers and at least one of the plurality of member nodes is an infrastructure node;
      add at least one virtual node that is not part of the mesh network to the first network as a spoke using long-range wireless communication (LRWC); and
      using the first network, exchange cryptographic data between the at least one virtual node, the center node, and the plurality of member nodes.

2. The system of claim 1, wherein the cryptographic data includes transaction data and a cryptographic hash of a block of a blockchain.

3. The system of claim 1, wherein the instructions further comprise instructions to: determine a topography of the mesh network by determining a wireless link topography of the center node and the plurality of member nodes to be remapped.

4. The system of claim 1, wherein the instructions further comprise instructions to: after exchanging cryptographic data, use a gossip algorithm to disseminate a block of a blockchain to the plurality of member nodes.

5. The system of claim 4, wherein using the gossip algorithm comprises: randomly selecting at least two of the plurality of member nodes for a pull message requesting blockchain data; and randomly providing at least two of the plurality of member nodes at least some of that blockchain data.

6. The system of claim 1, wherein the at least one virtual node is one of a remote server, a second center node of a second network, or an isolated node.

7. The system of claim 1, wherein the instructions to exchange cryptographic data further comprise instructions to: determine that one of the plurality of member nodes is to conduct a blockchain transaction with the virtual node, or determine that the virtual node is to conduct a blockchain transaction with one of the plurality of member nodes.

8. The system of claim 1, wherein the instructions further comprise instructions to: store the cryptographic data at the center node and provide it to the plurality of member nodes for storage thereat.

9. The system of claim 1, wherein the instructions further comprise instructions to: receive compensation for storing the cryptographic data at the center node; disseminate compensation to the plurality of member nodes; or both.

10. The system of claim 1, wherein the center node and the plurality of member nodes communicate with one another via a short-range wireless communication protocol, wherein the center node and the virtual node communicate with one another via a long-range wireless communication (LRWC) protocol.

11. The system of claim 1, further comprising: a gateway device enabling LRWC communication between the center node and the virtual node; and a short-range wireless communication system that comprises at least one wireless transceiver enabling SRWC communication between the center node and the plurality of member nodes.

12. A method, comprising:
joining a peer-to-peer mesh network having a plurality of member nodes using short-range wireless communication (SRWC);
determining, at a center node, a first network comprising the center node and the plurality of member nodes of the mesh network by remapping the mesh network as a star network based on the center node as a hub and the plurality of member nodes as spokes, wherein at least some of the plurality of member nodes are different vehicle computers and at least one of the plurality of member nodes is an infrastructure node;
adding at least one virtual node that is not part of the mesh network to the first network as a spoke using long-range wireless communication (LRWC); and
using the first network, exchanging cryptographic data between the at least one virtual node, the center node, and the plurality of member nodes,
wherein the center node is a vehicle computer.

13. The method of claim 12, wherein the cryptographic data includes transaction data and a cryptographic hash of a block of a blockchain.

14. The method of claim 12, further comprising: determining a topography of the mesh network by determining a wireless link topography of the center node and the plurality of member nodes to be remapped.

15. The method of claim 12, further comprising: after exchanging cryptographic data, using a gossip algorithm to disseminate a block of a blockchain to the plurality of member nodes.

* * * * *